March 20, 1956 R. E. McAFEE 2,738,650
FLUID PRESSURE MODULATING DEVICE
Filed Dec. 5, 1952 2 Sheets-Sheet 1

Inventor
Robert E. McAfee
Paul O. Pippel
Atty.

March 20, 1956  R. E. McAFEE  2,738,650
FLUID PRESSURE MODULATING DEVICE
Filed Dec. 5, 1952  2 Sheets-Sheet 2
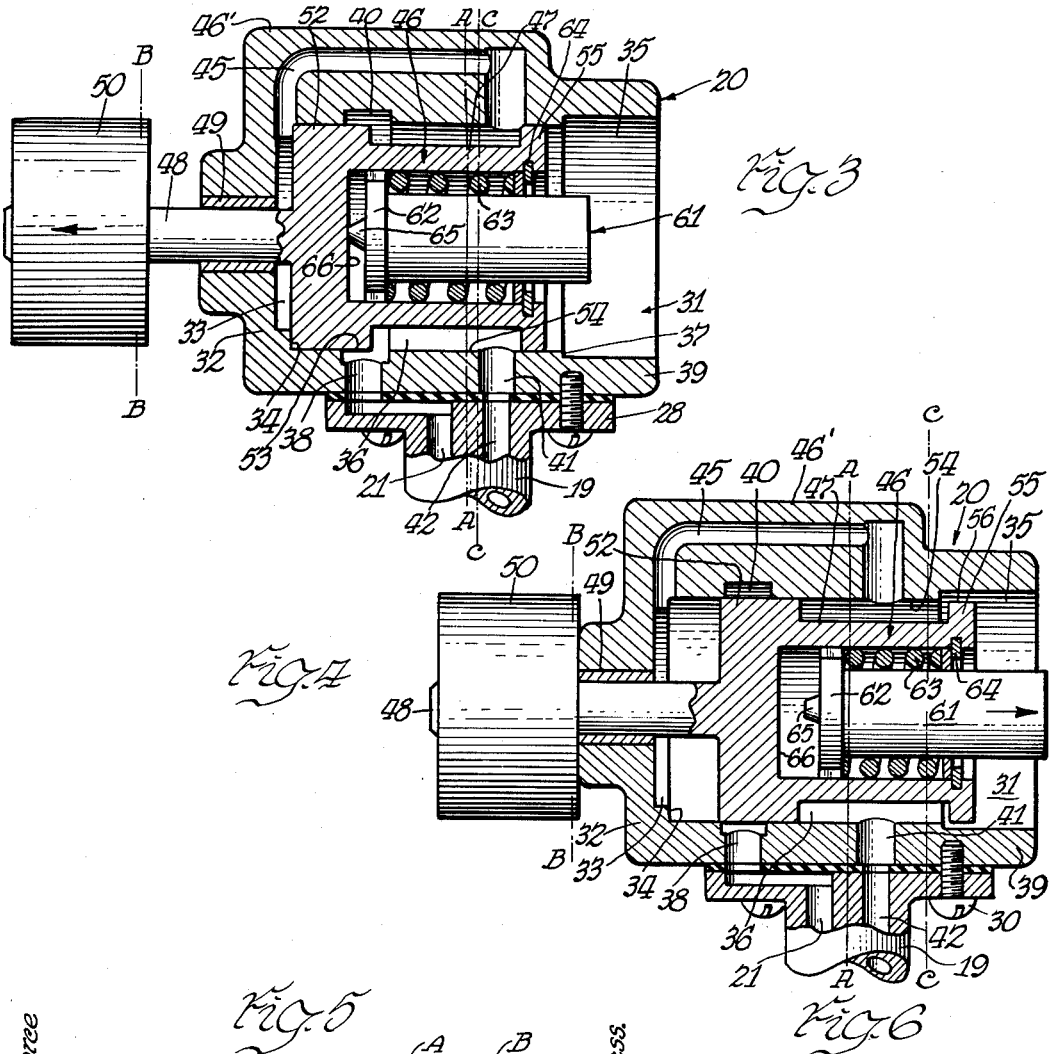
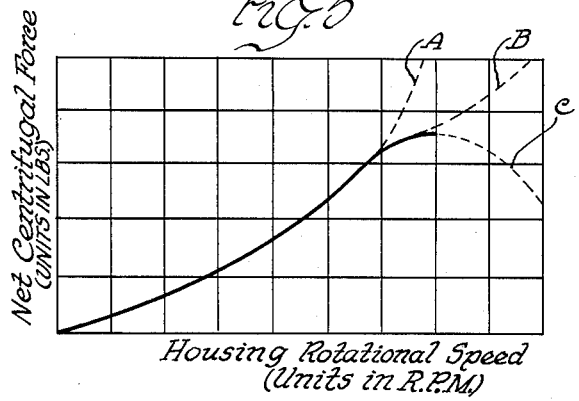
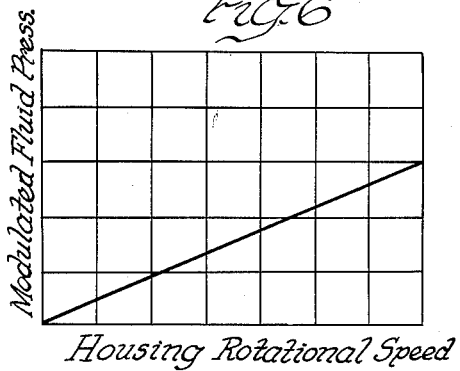
Inventor
Robert E. McAfee
Paul O. Pippel
Atty.

United States Patent Office 2,738,650
Patented Mar. 20, 1956

2,738,650

FLUID PRESSURE MODULATING DEVICE

Robert E. McAfee, Fort Wayne, Ind., assignor to International Harvester Company, a corporation of New Jersey Application December 5, 1952, Serial No. 324,382

13 Claims. (Cl. 60—97)

This invention relates to a novel fluid pressure modulating device and more particularly to a device for regulating the output or delivery pressure of fluid derived from a source of fluid under substantially constant pressure wherein the ratio of the delivery pressure to the rotational speed of a variable speed member is substantially constant.

Within the last decade or so, the popularity of automatic power transmission systems for use in motor vehicles has increased tremendously. The automatic transmission systems generally incorporated in motor vehicles, of recent date, are of the type which include a fluid coupling or a hydraulic torque converter drivingly connected to a change speed gear set which usually comprises epicyclic or planetary gear trains. The change speed gear set is designed to provide a number of different speed ratios between its input and output shafts which are individually and automatically obtainable, in succession, by progressive actuation of fluid responsive devices in succession. The fluid pressure responsive devices invariably include brake and clutch elements which are associated with various parts of the gear trains for controlling the speed and direction of rotation of the parts and are each operable upon the reception of fluid under a predetermined pressure.

In order to automatically obtain the most efficient driving speed relationship between the engine and the vehicle driving wheels based upon the vehicle speed and torque requirements, the change speed gear set is continually conditionable to provide the correct speed ratio in the change speed gear set at all times. Hence, it is customary to provide a regulating mechanism for controlling the pressure of fluid delivered to the pressure responsive devices in accordance with the rotational speed of a part or member of the change speed gear set such as the output shaft and the pressure of the fluid, which is generally oil but may be air under pressure greater or less than atmospheric pressure, is infinitely regulated from a predetermined low pressure corresponding to the lowest rotational speed of the member to a predetermined high pressure corresponding to a relatively higher speed of rotation. In other words, as the rotational speed increases there is an increase in fluid pressure delivered to the pressure responsive devices, and, conversely, the fluid pressure decreases when the rotational speed of the member decreases.

Inasmuch as the pressure responsive devices associated with certain parts of the change speed gear set must be actuated upon the reception of fluid under a predetermined pressure which is dependent upon the rotational speed of the member to obtain a particular speed ratio, it will be obvious that the ideal pressure regulating or modulating device would be one in which the pressure delivered would vary the same amount for the same change in the rotational speed of the member throughout the entire operational range of the regulating mechanism. In other words, the ideal pressure regulating device would deliver fluid under pressure which is directly proportional to the rotational speed of the member in accordance with a straight line function in order to properly space the shift or speed ratio changing points to insure well defined shift points.

Heretofore, it was impossible to obtain the straight line relationship between the fluid pressure and the rotational speed of the member since generally the pressure is controlled by a metering valve which is operated by a centrifugal type governor. It is inherent in this type of governor that the centrifugal force developed by the rotating flyweights, which force controls the positioning of the metering valve and is directly proportional to the fluid pressure delivered, varies in accordance with a parabolic function rather than a straight line function with the result that the pressure varies a greater amount for a given increment of speed variation at the upper end of the operational range of the device when compared with the pressure change for the same increment of speed variation at the opposite end of the range. Obviously, the shift or speed ratio changing points are relatively close in terms of units of rotational speed and are not very well defined. It is, therefore, the primary objective of the present invention to overcome the above noted disadvantage of prior fluid pressure modulating devices by providing a device which will deliver fluid under variable regulated pressure wherein the ratio of the fluid pressure to the rotational speed of the member is substantially constant throughout the range of operation of the device.

Another object is to provide a fluid pressure modulating device which includes a primary flyweight and a secondary flyweight movable relative to the primary flyweight and mounted for rotation about an axis intersecting the line of relative movement of the weights at a point between the center of mass of the secondary weight and the center of mass of the weights combined.

A further object is to provide pulsator means operable responsively to fluid pressure to urge the primary weight of a centrifugal type governor radially toward the rotational axis of the weight.

A still further object is to provide a centrifugal type device in which the net centrifugal force developed by the centrifugal flyweights varies substantially in accordance with the equation $X = ky$, where $X$ is the net centrifugal force, $y$ is the rotational speed of the flyweights, and $k$ is a constant.

The foregoing and other important objects and desirable features inherent in and encompassed by the invention, together with many of the purposes and uses thereof, will become readily apparent from a reading of the ensuing description in conjunction with the annexed drawings, in which:

Figure 3 is a view similar to Figure 2 illustrating the parts in one extreme operational position;

Figure 4 is a view similar to Figure 2 showing the parts in another extreme operational position;

Figure 5 is a graph illustrating a principle of the invention, and

Figure 6 is a graph showing the relationship of the fluid pressure delivered to the pressure responsive devices and the rotational speed of the pressure modulating device.

Figure 1:
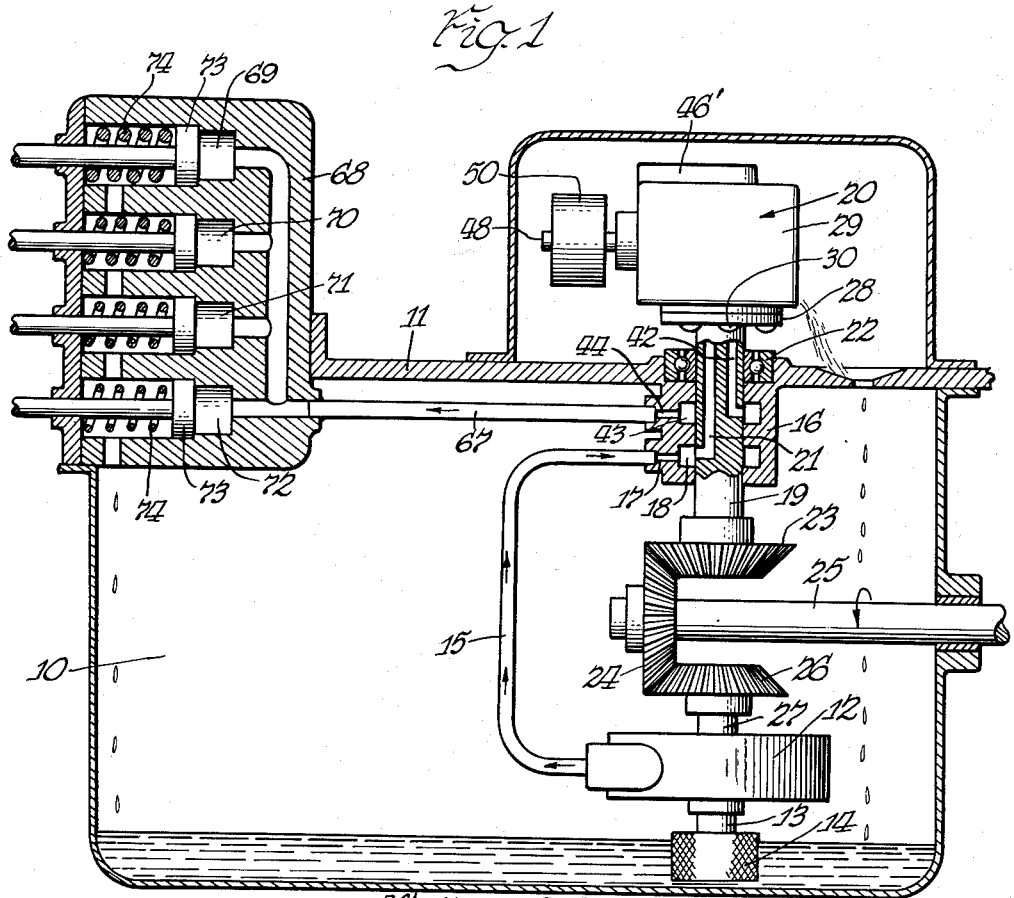
Figure 1 shows, somewhat diagrammatically, a fluid pressure modulating device embodying the invention in a fluid pressure regulating system.

Referring to the drawings, wherein like reference characters designate like elements throughout the various views, an oil sump 10 is shown depending below and attached to a lower wall portion 11 of a change speed gear set. The oil sump 10 serves as an oil reservoir or supply tank for a constant delivery pressure, positive displacement hydraulic pump 12. The pump 12 is of a conventional type and has its inlet opening connected to one end of a supply pipe 13. The opposite end of the supply pipe 13 is provided with a screen filter 14 which is disposed below the level of the oil contained in the oil sump 10.

Leading from the pressure side of the pump 13 is a conduit 15 which is connected to the lower portion of a cylindrical body 16 which may be integrally formed with the lower wall 11 of the change speed gear set as shown or rigidly attached thereto. A passage 17 is formed in the body 16 which opens into an internal annular recess or groove 18. The body 16 is provided with a vertically extending, centrally located bore in which the drive shaft 19 of the pressure modulating device, designated generally by numeral 20 and which will be described in detail hereinafter, is rotatably mounted. Oil under pressure received in the groove 18 from the pump 13 is directed vertically upwardly through a passage 21 which is continually in fluid communication with the groove 18 during the operation of the device 20. As shown in Figure 1, an anti-friction bearing unit 22 may be employed to rotatably support the shaft 19. It is also to be understood that suitable sealing means (not shown) are provided for preventing the escape of fluid from the body 16. A bevel gear 23 is secured to the lower end of the shaft 19 and meshes with a gear 24 keyed to a shaft 25. The shaft 25, in turn, is driven by a part or member (not shown) at the change speed gear set such as the output or tail shaft. It will be appreciated that the speed at which shaft 19 rotates is dependent upon the speed of rotation of shaft 25, which speed varies in accordance with the vehicle speed and torque requirements. It will also be noted that the pump 12 is driven by shaft 25 through the intermediary of gear 26 which is keyed to the pump shaft 27.

The uppermost end of the shaft 19 is provided with a radially extending attaching flange 28 which is connected to a housing 29 by means of threaded bolts 30 whereby the housing rotates with the shaft 19. The housing 29 has a cylindrical bore 31 formed therein which is defined at one end by an end wall 32 and which opens outwardly of the housing at its other end. The bore 31 has a section 33 of a smaller diameter adjacent the wall 32 to form an annular shoulder 34, the purpose of which will be explained hereinafter. Similarly, the section 35 of the bore 31 opposite the wall 32 has a diameter greater than the diameters of section 33 and intermediate section 36 of the bore to provide an annular step or shoulder 37. The major axis of the bore 31 is substantially perpendicular to the rotational axis A—A of the housing 29 as shown in Figures 2, 3 and 4.

An aperture 38 extending substantially parallel to the axis of rotation of the housing 29 is formed in the lower wall 39 of the housing and is registrable with the passage 21. The aperture 38 is in communication with an internal annular recess 40 formed in the intermediate section 36 of the bore 31. A similar aperture 41, spaced from the aperture 38, is provided in the wall 39 and is alignable with a vertical passage 42 formed in the shaft 19. The passage 42 establishes fluid communication between the aperture 41 and an internal groove 43 formed in the body 16. An opening 44 communicates with the groove 43, which is shown vertically spaced above the groove 18.

Figure 2:
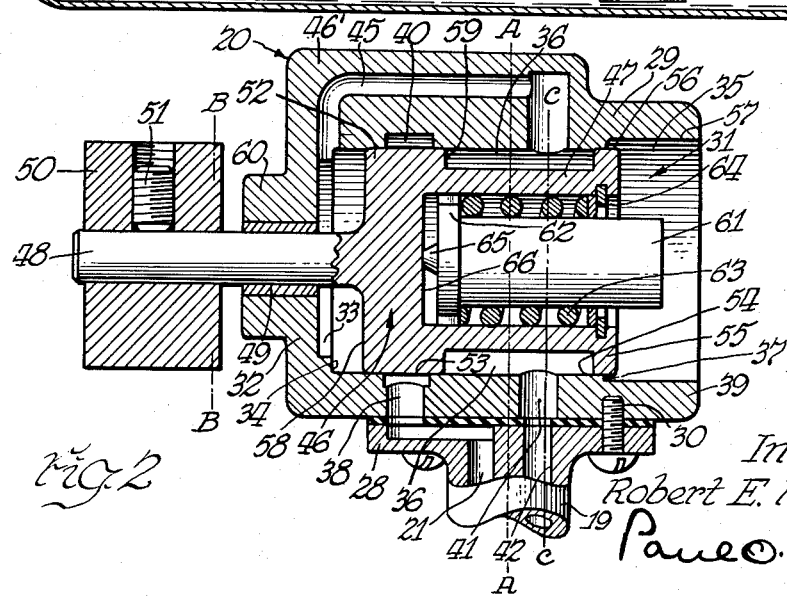
Figure 2 is a vertical sectional view of a portion of the fluid pressure modulating device showing certain parts thereof in a particular position.

As best shown in Figures 2, 3 and 4, a passage 45 is formed in the upper wall 46' of the housing 29. One end of the passage 45 opens into the bore 31 adjacent the end wall 32 and the opposite end opens into the bore 31 diametrically opposite the aperture 41 in the lower wall 39.

Slidably supported within the housing 29 is a plunger, designated generally by numeral 46. The plunger 46 is adapted to move in a radial direction with respect to the housing 29 and includes a cylindrical cup-shaped portion 47 and a stem 48. The stem 48 extends through an oil-sealed bearing 49 in the end wall 32 of the housing 29 and is adapted to have a weight 50 secured thereto exteriorly of the housing. The weight 50 is shown connected to the stem 48 by means of a set screw 51.

An annular ridge 52 is formed on the portion 47 adjacent the base of the stem 48, the outer surface 53 of which slidingly engages the interior surface 54 of the intermediate section 36 of the bore 31. The ridge 52 has a length, measured in a radial direction with respect to the rotational axis of the shaft 19, greater than the radial length of the annular recess 40 whereby the ridge serves as a slide valve for controlling the flow of fluid between the passage 21 and the interior of the housing 29. The radially spaced opposite end of the portion 47 is also provided with an annular ridge 55. The annular ridge 55 functions as a slide valve for regulating the fluid discharge from within the housing 29 to the exterior thereof. As shown in Figure 4, the ridge 55 is relatively slidable with respect to the housing 29 to a position wherein the outer peripheral surface 56, which is engageable with the interior surface 54 of the intermediate section 36, is spaced from the interior surface of the section 35 of the bore 31. From the foregoing, it will be appreciated that the slide valves described above act in unison to control the flow of fluid received from the pump 12. As an example, in Figure 2 they are positioned to prevent fluid from entering or leaving the interior of the housing 29; in Figure 3, groove 40 is partially uncovered whereby fluid is emitted into the housing 29 from the passage 21 and fluid contained within the housing and passage 42, which is in communication with the interior of the housing at all times, is prevented from escaping from the housing to the sump 10, and, in Figure 4, fluid communication is disestablished between passage 21 and the housing and is established between passage 42 and housing 29 and the exterior of the housing. Furthermore, by virtue of the passage 45 provided in the upper wall 46, the fluid pressure existing in the housing 29 on one side of the ridge 52 is substantially equal to the fluid pressure present on the opposite side. However, since the surface 58 of the ridge 52 in contact with the fluid is greater in area than the spaced opposite surface 59, the resultant force tends to move the plunger 46 radially to the right, as viewed in Figures 2, 3 and 4. Movement of the plunger 46 to the right is limited by the weight 50 coming into abutting engagement with a raised boss formed integrally with the end wall 32 of the housing 29, as shown in Figure 4. Similarly, the shoulder 34 disposed within the housing 29 acts as a stop means for limiting the radial positioning of the plunger 46 to the left with respect to the housing 29 as shown in Figure 3. It will be noted that both surfaces 58 and 59 of the ridge 52 are always in fluid communication with each other regardless of the positioning of the plunger 46 with respect to the housing 29.

Mounted in the hollow interior of the cup-shaped portion 47 is a second plunger 61 which is adapted to slide independently in a radial direction with respect to the housing 29 and the plunger 46. The second plunger has a slotted flange 62 at one end thereof which serves as an abutment for one end of a helical spring 63. The opposite end of the spring 63 abuts a snap ring 64 confined in a groove formed in the interior surface of the portion 47. It will be obvious that the spring 63 resists relative radial movement between the plungers 46 and 61 and tends to urge the projection 65 formed on the inner end of the second plunger 61 into contact with the bottom wall 66 of the portion 47.

As shown in Figure 1, a conduit 67 establishes fluid communication between the opening 44 and the interior of a casing 68 which has a plurality of bores 69, 70, 71 and 72 formed therein. Fluid having substantially the same pressure is directed to each bore 69, 70, 71 and 72 from the conduit 67 through branch lines. Slidably mounted within each bore 69, 70, 71 and 72 is a piston 73. A helical spring 74 is confined in each bore 69, 70, 71 and 72 and is adapted to urge the piston 73 associated therewith, to the right, as viewed in Figure 1, which position represents the contracted or collapsed position of the piston. It will be noted that each piston and its respective bore is substantially a duplicate of the other pistons and their respective bores but the biasing forces of the springs 74 are uniformly different. The spring 74 contained in bore 69 exerts a progressively greater force on the piston 73 associated therewith than the adjacent springs do on their pistons whereby fluid having a greater pressure is needed to compress the spring and move the piston in bore 69 when compared with the pressure values needed to move the pistons in the other bores 70, 71 and 72. Movement of a piston 73 to the left, as viewed in Figure 1, to its expanded position, causes actuation of a brake or clutch element (not shown) of the change speed gear set. From the foregoing, it will be appreciated that each piston 73 will move to its expanded position upon the reception of fluid in the conduit 67 of a predetermined pressure in succession.

In operation, the housing 29 is rotated by shaft 25 about the fixed rotational axis A—A at variable speeds depending upon the speed and torque requirements of the motor vehicle. As the housing 29 rotates the weight 50, plunger 46 and plunger 61 move radially away from the rotational axis A—A as a unit because of the centrifugal force developed by rotating the mass of the unit. The magnitude of the centrifugal force developed by a rotating mass is influenced by two dimensions, namely, the rotational speed of the mass and the radial distance the center of gravity lies from the rotational axis. The unit has an effective center of gravity or mass which is radially spaced from the axis A—A. The center of gravity or mass of the primary flyweight which includes the weight 50 and the plunger 46 lies along line B—B while the center of gravity of the plunger 61 or secondary flyweight lies along line C—C. It will be noticed that the rotational axis A—A is always disposed between lines B—B and C—C regardless of the positioning of the plungers 46 and 61 with respect to each other and with respect to the housing 29. Hence, it will be appreciated that the centrifugal force created by the plunger 61 as it is rotated is in direct opposition to centrifugal force developed by the primary flyweight at all times. Thus, the net centrifugal force acting on the plunger 46 at any particular rotational speed of the housing 29 is obtained by subtracting the centrifugal force of the secondary flyweight 61 from the centrifugal force of the primary flyweight.

In a simple type of speed responsive device wherein a weight is rotated at various speeds about a fixed axis and the weight is allowed to move radially with respect to the axis, the centrifugal force created tending to move the weight radially outwardly varies in accordance with a parabolic function of the rotational speed. Referring to Figure 5, curve A represents a graphic illustration of the above inherent characteristic of simple speed responsive devices. It will be obvious that for a given increment of speed change at the upper end of the curve A the centrifugal force varies rapidly when compared with the variation in force for the same increment of speed at the lower end of the curve A. Consequently, if the centrifugal force is used to control the action of a valve which, in turn, regulates the fluid pressure delivered to a pressure responsive mechanism from a source of fluid pressure, the pressure variation will not be uniform throughout the speed range of the speed responsive device. In other words, the pressure rise would be greater for a given increment of speed increase at the higher speeds than at the lower speeds of the device. It will be appreciated that the existence of such a condition renders the automatic operation of a fluid pressure actuated change speed gear set difficult since the shift points or speed ratio changing points at higher speeds are not properly spaced in terms of speed and, hence, are not well defined.

In the fluid pressure modulating device shown in Figure 1, the various movable parts within the housing 29 assume the position shown in Figure 2 upon initial rotation of the housing 29 at a relatively low speed. Fluid under constant pressure is prevented from entering the housing 29 by virtue of the fact that ridge 52 completely covers the groove 40 and any fluid contained within the housing and casing 68 is prevented from draining to the oil sump 10 since the ridge 55 is in engagement with the cylindrical surface 54. As the rotational speed increases, the net centrifugal force developed increases and tends to move the unit which includes the weight 50, plunger 46, and the plunger 61 to the left, as viewed in Figure 3, thereby moving the ridge 52 to a position where the groove 40 is partially uncovered allowing fluid under pressure to enter the housing 29. The entering fluid flows through passage 45 with the result that the fluid acts upon the surface 58 and exerts a force on the unit in opposition to the net centrifugal force. It will be appreciated that spring 63 is sufficiently strong enough to prevent relative movement of plunger 61 with respect to the plunger 46 at this intermediate rotational speed. Furthermore, fluid received in the housing 29 flows to the casing 68 where one or more of the pistons 73 will be moved to the left, as viewed in Figure 1, depending on the pressure of the fluid bleed into the housing and the resilient characteristics of the springs 74. It will be apparent that the net centrifugal force acting radially outwardly is always in direct opposition to the force of the fluid pressure acting on the plunger 46 which is equal to the area of surface 58 less the area surface 59 multiplied by the fluid pressure within the housing 29. In Figure 3 the net centrifugal force exceeds the force of the fluid with the result that the plunger 46 moves to abutting engagement with the shoulder 34 to thus limit further outward movement of the unit. This condition will exist, obviously, until the force of the fluid exceeds the net centrifugal force.

As the rotational speed of the housing 29 increases further, the centrifugal force created by the plunger 61, which is always in opposition to the centrifugal force of the plunger 46 and weight 50, increases causing the spring 63 to deflect or compress a certain degree. The deflection of the spring 63, in turn, increases the radial distance between the rotational axis A—A and line C—C, causing a further increase in the centrifugal force developed by the plunger 61. It will be appreciated that inasmuch as the plunger 46 is in engagement with the shoulder 34, the centrifugal force developed by the plunger 46 and weight 50 can only be increased by increasing the rotational speed since the radius to the center of gravity or mass is limited, whereas the centrifugal force of the plunger 61 increases by two dimensions, namely, the rotational speed and the increase in the radius to its center of gravity. When the force of the fluid exceeds the net centrifugal force, the plunger 46 is moved radially inwardly to move the ridge 52 over the groove 40 and prevent the entrance of fluid into the housing 29. As the plunger 46 moves to the right, as viewed in Figure 4, the volume of the space in which the fluid is contained is increased, thereby decreasing the fluid pressure force acting on the unit to a value which is approximately equal to the net centrifugal force. Since the forces acting on the unit are substantially balanced the unit assumes the position shown in Figure 2. However, if the force, due to the fluid pressure and the centrifugal force of the plunger 61, exceeds the centrifugal force of the plunger 46 and the weight 50 when the ridge 52 covers the groove 40, the plunger 46 moves further to the right, as shown in Figure 4, moving the ridge 55 out of engagement with the surface 54 and allows fluid in the interior of the housing 29 to drain to the oil sump 10 thereby decreasing the fluid pressure in the housing. The draining operation continues until the force of the fluid decreases to value substantially equal to the net centrifugal force of the unit whereupon the plunger 46 assumes the position shown in Figure 2. Thus, the pressure of the fluid contained in the casing is modulated in accordance with the rotational speed of shaft 25.

The shape of the net centrifugal force curve can be altered from the conventional parabolic curve A by varying the mass of the weight 50, the mass of plunger 46, the mass of plunger 61, the rate of the spring 63, and the radial distance the centers of gravity of the plungers 61 and 46 can move relatively to each other. Referring to Figure 5, curve B, which approaches a straight line, is the most desirable for obtaining the straight line relationship between the modulated fluid pressure and the rotational speed of the housing 29, as shown in Figure 6, for automatically operating a change speed gear set. Curve C represents a possible variation in the net centrifugal force curve which deviates considerably from the usual parabolic curve A.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a device for modulating the pressure of fluid derived from a source of fluid under pressure including a rotatable centrifugal mechanism capable of moving radially with respect to its rotational axis to various radial positions; pulsator means for the reception of the pressure modulated fluid, said pulsator means being operable responsively to fluid pressure to urge said mechanism radially toward said rotational axis; control valve means interposed between said source of fluid pressure and said pulsator means, said valve means being operable under control of said mechanism to open responsively to radial departure of said mechanism a predetermined distance from said rotational axis whereby fluid is admitted into said pulsator means, said pulsator means being operable upon the attainment of a predetermined pressure of fluid admitted thereto to prevail over the centrifugal force of said mechanism to urge said mechanism radially toward said rotational axis to close said valve means.

2. The device as set forth in claim 1, in which said mechanism includes a relatively movable part, said part being movable in a direction to develop a centrifugal force tending to close said valve means upon the attainment of a predetermined rotational speed of said mechanism.

3. The device as set forth in claim 1, in which said mechanism includes a primary part and a secondary part, said secondary part being slidably supported by and relatively movable to said primary part to develop a centrifugal force in opposition to the centrifugal force developed by said primary part upon the attainment of a predetermined rotational speed of said mechanism.

4. In a device for modulating the pressure of fluid derived from a source of fluid under pressure including a rotatable centrifugal mechanism capable of moving with respect to its rotational axis to various positions; pulsator means for the reception of the pressure modulated fluid, said pulsator means being operable responsively to fluid pressure to urge said mechanism radially toward said rotational axis; first control valve means interposed between said source of fluid pressure and said pulsator means, said valve means being operable under control of said mechanism to open in response to a predetermined positioning of said mechanism whereby fluid is admitted into said pulsator means; and a second control valve means interposed between said pulsator means and the atmosphere, said second valve means being operable under control of said mechanism to open in response to a second predetermined positioning of said mechanism whereby fluid is emitted from said pulsator means to the atmosphere.

5. The device as set forth in claim 4, in which said mechanism includes a relatively movable part, said part being movable in a direction to develop a centrifugal force tending to move said mechanism to the position corresponding to the valve-closed condition of said first valve means and the valve-open condition of said second valve means upon the attainment of a predetermined rotational speed of said mechanism.

6. The device as set forth in claim 4, in which said pulsator means is operable upon the attainment of a predetermined pressure of fluid admitted thereto to prevail over the centrifugal force of said mechanism acting radially of said rotational axis to close said first valve means and open said second valve means.

7. A device for modulating the pressure of fluid derived from a source of fluid under substantially constant pressure wherein the ratio of the modulated fluid pressure to the rotational speed of a member is substantially constant and for conducting the pressure modulated fluid to a plurality of intercommunicatively connected fluid pressure-receiving actuators of the contractibly biased expansible type, each of the actuators being expansible upon the reception of fluid therein having a predetermined pressure, the combination including said member comprising, a centrifugal mechanism supported and rotatably driven by said member, said mechanism being capable of moving radially with respect to the rotational axis of said member to various positions; pulsator means operable responsively to fluid pressure to urge said mechanism radially toward said rotational axis; control valve means interposed between said source of fluid pressure and said pulsator means, said valve means being operable under control of said mechanism to open in response to a predetermined positioning of said mechanism whereby fluid is admitted into said pulsator means, said pulsator means being operable upon the attainment of a predetermined pressure of fluid admitted thereto to prevail over the centrifugal force of said mechanism acting radially of said rotational axis to close said valve means; and conduit means extending between the modulated pressure-receiving actuators and said pulsator for conducting fluid therebetween.

8. The device as set forth in claim 7, in which a second control valve means is provided which is conditionable to establish fluid communication between said conduit means and the atmosphere, said second valve means being operable under control of said mechanism to open in response to a second predetermined positioning of said mechanism whereby said conduit means is placed in fluid communication with the atmosphere.

9. The device as set forth in claim 8, in which said mechanism includes a relatively removable part, said part being movable in a direction to develop a centrifugal force tending to move said mechanism to a position corresponding to the valve-closed condition of said first valve means and the valve-open condition of said second valve means upon the attainment of a predetermined rotational speed of said member.

10. In a device for modulating the pressure of fluid derived from a source of fluid under substantially constant pressure; a primary centrifugal weight; a secondary centrifugal weight, means confining said weights for relative movement along a line intersecting their respective centers of mass; means rotating said weights about an axis intersecting said line of relative movement at a point between the center of mass of said secondary weight and the center of mass of said primary weight; stop means limiting the approach of said centers of mass of said weights toward one another; means yieldably urging said weights together to said approach limit; pulsator means operable responsively to fluid pressure to urge the primary weight radially toward said rotational axis; and control valve means interposed between said source of fluid pressure and said pulsator means, said valve means being operable under control of said weights to open responsively to radial departure of the primary weight a predetermined distance from said rotational axis whereby fluid is admitted into said pulsator means, said pulsator means being operable upon the attainment of a predetermined pressure of fluid admitted thereto to prevail over the net centrifugal force of said weights acting radially of said rotational axis to close said valve means.

11. In a device for modulating the pressure of fluid derived from a source of fluid under pressure including a rotatable centrifugal mechanism capable of moving with respect to its rotational axis to various positions, said mechanism including a first part and a second part; chamber means for the reception of the pressure modulated fluid; control valve means interposed between said source of fluid pressure and said chamber means, said valve means being operable under control of said mechanism to open in response to a predetermined positioning of said mechanism whereby fluid is admitted into said chamber means, said first part being fixed to said valve means; and regulating means for controlling the movement of said mechanism to the position corresponding to said valve open condition of said valve means including said second part of said mechanism, said second part being movable with respect to said first part, said valve means and the rotational axis of said mechanism in a direction to develop a centrifugal force tending to close said valve means upon the attainment of a predetermined rotational speed of said mechanism.

12. A device including valve means movable between two positions corresponding to a valve opened condition and a valve closed condition; control means for applying an actuating force to said valve means for conditioning said valve including a rotatable centrifugal mechanism operatively connected to said valve means for applying a force of varying magnitude for moving said valve means in one direction, said centrifugal mechanism including a first part fixed with respect to said valve means and a second part having centers of mass disposed on respective diametrically opposite sides of the rotational axis of said centrifugal mechanism, said first and second parts moving radially in unison in one direction to various positions with respect to the rotational axis of said centrifugal mechanism upon rotation of the same, said second part being movable with respect to said first part, said valve means, and the rotational axis of said mechanism in an opposite radial direction upon the attainment of a predetermined rotational speed of said centrifugal mechanism.

13. In a device for modulating the pressure of fluid drive from a source of fluid under pressure including chamber means for the reception of pressure modulated fluid; control valve means interposed between said source of fluid pressure and said chamber means, said valve means being movable to a valve opened condition whereby fluid is admitted into said chamber means; and control means for moving said valve means to establish various conditions thereof including a rotatable centrifugal mechanism operatively connected to said valve means for moving said valve means to a position corresponding to a valve opened condition including a first part fixed with respect to said valve means and a second part having centers of mass disposed on respective diametrically opposite sides of the rotational axis of said centrifugal mechanism, said first and second parts radially moving in unison in one direction to various positions with respect to the rotational axis of said centrifugal mechanism upon rotation of the same, said second part being movable with respect to said first part, said valve means, and the rotational axis of said mechanism in an opposite radial direction upon the attainment of a predetermined rotational speed of said mechanism.

References Cited in the file of this patent

UNITED STATES PATENTS

| 1,791,028 | Huff | Feb. 3, 1931 |
| 2,311,209 | Carnagua | Feb. 16, 1943 |
| 2,697,363 | Sheppard | Dec. 21, 1954 |

FOREIGN PATENTS

| 114,836 | Great Britain | 1919 |